UNITED STATES PATENT OFFICE.

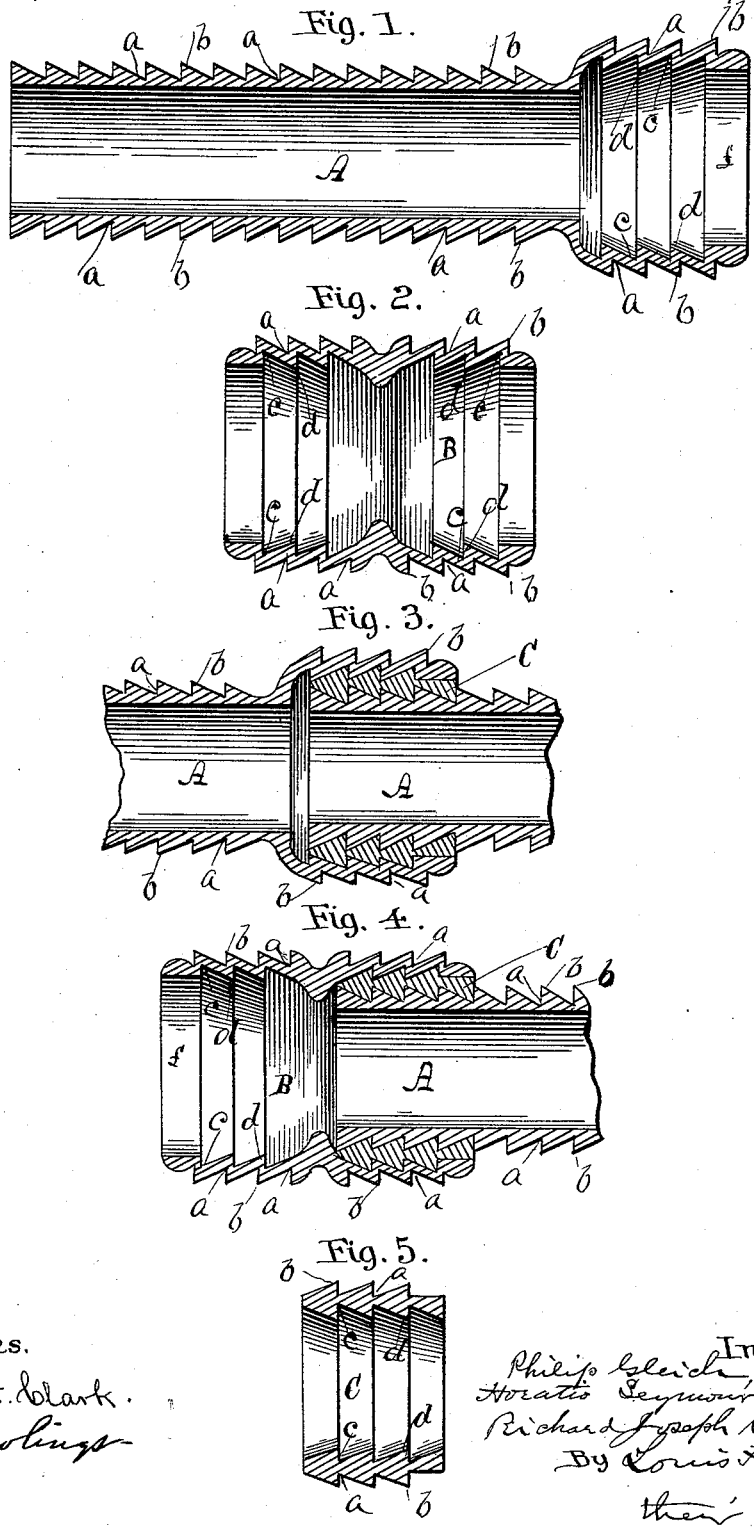

PHILIP GLEICH, HORATIO SEYMOUR KRAUSE, AND RICHARD JOSEPH CHENERY, OF ST. PAUL, MINNESOTA.

PIPE AND PIPE-FITTINGS.

SPECIFICATION forming part of Letters Patent No. 392,265, dated November 6, 1888.

Application filed April 9, 1887. Serial No. 234,266. (No model.)

*To all whom it may concern:*

Be it known that we, PHILIP GLEICH, HORATIO SEYMOUR KRAUSE, and RICHARD JOSEPH CHENERY, citizens of the United States, residing in St. Paul, in the county of Ramsey and State of Minnesota, have invented Improvements in Pipes and Pipe-Fittings; and we do hereby declare that the following is a full and exact description of the same, reference being had to the accompanying drawings, making part of this specification.

Our improvements are applicable to pipes for various uses both for conveying liquids and aeriform fluids, as steam and water pipes, oil-pipes, soil-pipes, and air and gas pipes.

Our invention consists, first, in a pipe formed with peripheral corrugations or alternate peripheral grooves and ridges or beads around its outer surface; second, in combination with such pipe in a pipe-joint socket having such alternate grooves and ridges upon its inner surface; third, in combination with such pipe in a pipe-joint socket having such alternate grooves and ridges both upon its inner and outer surfaces; fourth, in a pipe-socket sleeve having such alternate grooves and ridges on its inner surface, in combination with a pipe having such alternate grooves and ridges on its outer surface; fifth, in the combination of a pipe having such alternate grooves and ridges upon its outer surface, a joint-socket having such alternate grooves and ridges on its inner surface and fitting around one end of the pipe, and a soft-metal joint-ring fitting the adjacent grooves and ridges of the pipe and socket; sixth, in a pipe or pipe-socket having alternate grooves and ridges around its surface, having substantially the triangular form in cross-section represented in the drawings.

In the accompanying drawings, Figure 1 represents a longitudinal axial section of a length of pipe formed according to our invention; Fig. 2, a longitudinal axial section of a separate joint-sleeve formed according to our invention; Fig. 3, a longitudinal axial section of portions of two lengths of pipes formed according to our invention and coupled together; Fig. 4, a longitudinal axial section of a portion of a length of pipe and a joint-sleeve formed according to our invention and joined together; Fig. 5, a longitudinal axial section of a soft-metal joint-ring formed according to our invention.

Like letters designate corresponding parts in all of the figures.

In the drawings, A represents a pipe formed according to our invention, B a socket-sleeve formed according to our invention, and C a soft-metal joint-ring formed according to our invention.

In the drawings, also, $a\ b\ a\ b$ represent the alternate grooves and ridges formed on the outside of the several parts of the invention, and $c\ d\ c\ d$ the alternate grooves and ridges formed on the inside of the different parts. These alternate grooves and ridges may vary in form to fulfill the several purposes of our invention, more or less perfectly; but they are preferably of the form shown in the drawings, or approximately of that form, namely, of triangular form in cross-section—that is, in the longitudinal direction of the pipe—the surfaces thereof being alternately at right angles to the axis of the pipe and oblique to the axis. The purposes of these alternate grooves and ridges are, first, in respect to the body of the pipe, they greatly facilitate the cutting off of the pipe, when this is required, as is often the case, and making a good, even, clean cut without splitting or chipping the pipe, to which the ordinary pipes are so liable, since by simply applying a cold chisel or other proper instrument at the bottom of any one of the angular grooves in the pipe the pipe is readily severed, accurately following the said bottom of the groove all around the pipe, and the abrupt projection of the ridge adjacent to the groove prevents the splitting or chipping of the pipe. Besides, these grooves occurring at short distances apart it is easy to cut the pipe readily, where desired, and thus have an abrupt or square end where it is cut off, so that the end is of the proper shape to fit the joint-socket and make a good joint. There is also a saving of time in cutting off the pipe, since this pipe requires no previous filing around the surface before applying the cold chisel, as is the case with the ordinary pipe, and there is no loss of pipe by breakage or injury. For this purpose of cutting the pipe the sharp triangular form of the grooves is the best, for obvious reasons. The pipe does not, or need not, cost any more than the smooth pipe of equal diameter, and it may cost even less, since we find that with the same amount of metal in a given length and interior diameter of pipe the corrugated form of alternate peripheral grooves and ridges is stronger than the smooth pipe of the same length and interior diameter.

The second main purpose of this invention relates to the socket-joint, for, by means of the grooves and ridges both upon the outside of the pipe-body and the inside of the socket in which it is inserted, when the soft-metal ring is run in between the said surfaces the ring itself has corresponding grooves and ridges on both the inner and outer surfaces, as shown in Fig. 5, so that the two lengths of pipe cannot be drawn apart except by tearing through the material of the filling-ring, and every movement of the pipe in the socket causes a wedging and tightening action on the said soft-metal ring, serving to tighten instead of loosening the joint; and this is evidently the case whether the movement is to draw the pipe out of the socket or force it inward or bend it therein out of axial line.

By reference to Figs. 3 and 4 it will be seen that the exterior edges of the pipe tend to wedge more tightly in the packing-ring as the pipe is drawn outwardly, thus tightening the joint more and more; and the interior ridges in the coupling-socket have a similar wedge-like action on the packing-ring if the pipe is forced farther into the socket. It is also obvious that any tendency to bend the coupled pipes out of line at the joints has a similar effect to tighten in the packing-ring either on the inside or the outside of the pipe and socket. It is also to be observed that three or more of these wedge-acting ridges are shown for each joint-lap, so that if one should fail to any extent to make a tight joint the others may be relied on.

The interior of the mouth of the joint-socket is or may be made cylindrical, as shown at $f$ in the figures.

It may be remarked that it is not necessary in all cases to have the whole length of a section of pipe formed with these alternate grooves and ridges. For some purposes or in some cases it would only be necessary for the outside of the pipe to be so formed for a short distance from the end, as in coupling with a sleeve around it; or, if preferred in any instance, the grooves and ridges may be extended the whole length of the pipe.

The outer surface of the joint-socket is provided with similar peripheral grooves and ridges to conform to those on the inside of the same and give lightness as well as sufficient strength thereto and to be more readily cut off, if desired. This form of the outer surface of the pipe or joint-socket has an ornamental appearance, and wherever it may be required to extend such a pipe through a room it need not be boxed for concealment, because of its good appearance. The corrugated form also will assist in supporting or suspending the pipe, since the supporting wires or bands may be more conveniently and efficiently applied in the grooves than around smooth pipes.

We claim as our invention—

1. A pipe formed with alternate peripheral grooves and ridges around its outer surface throughout its length, for the purposes herein set forth.

2. In combination with the pipe described, formed with alternate peripheral grooves and ridges around its outer surface, a pipe-coupling socket adapted to receive the end of said pipe, and having alternate grooves and ridges around its inner surface, and a soft-metal packing between the pipe and socket, as herein set forth.

3. In combination with a pipe formed with alternate peripheral grooves and ridges around its outer surface, a pipe-coupling socket adapted to receive the end of the pipe therein, and having alternate grooves and ridges around both its inner and outer surfaces, as herein set forth.

In testimony whereof we have hereunto set our hands in the presence of two subscribing witnesses.

PHILIP GLEICH.
HORATIO SEYMOUR KRAUSE.
RICHARD JOSEPH CHENERY.

Witnesses:
LOUIS FEESER, Jr.,
HENRY E. RANDALL.